(12) United States Patent
Jordan et al.

(10) Patent No.: US 7,833,291 B2
(45) Date of Patent: Nov. 16, 2010

(54) DISPERSION DYE, THE PRODUCTION AND USE THEREOF

(75) Inventors: Hartwig Jordan, Bergisch-Gladbach (DE); Stefan Neubauer, Köln (DE); Anthony Lawrence, Manchester (GB); Nigel Hall, Bury (GB)

(73) Assignee: DyStar Textilfarben GmbH & Co. Deutschland KG, Frankfurt am Main (DE)

( * ) Notice: Subject to any disclaimer, the term of this patent is extended or adjusted under 35 U.S.C. 154(b) by 0 days.

(21) Appl. No.: 12/524,003

(22) PCT Filed: Jan. 14, 2008

(86) PCT No.: PCT/EP2008/050318
§ 371 (c)(1),
(2), (4) Date: Jul. 22, 2009

(87) PCT Pub. No.: WO2008/090042
PCT Pub. Date: Jul. 31, 2008

(65) Prior Publication Data
US 2010/0076182 A1 Mar. 25, 2010

(30) Foreign Application Priority Data
Jan. 23, 2007 (DE) .................... 10 2007 003 372

(51) Int. Cl.
*D06P 5/17* (2006.01)
*C09B 29/00* (2006.01)

(52) U.S. Cl. .............. 8/464; 8/662; 8/690; 8/691; 8/692; 534/788

(58) Field of Classification Search ............ 8/464, 8/662, 690, 691, 692; 534/788
See application file for complete search history.

(56) References Cited

U.S. PATENT DOCUMENTS
5,569,751 A 10/1996 Buhler

FOREIGN PATENT DOCUMENTS

| EP | 0492893 A2 | 7/1992 |
|---|---|---|
| GB | 909843 | 11/1962 |
| JP | 48096621 A | 12/1973 |
| JP | 49036725 A | 4/1974 |
| JP | 54029331 A | 3/1979 |
| JP | 58002352 A | 1/1983 |
| WO | WO-95/20014 A1 | 7/1995 |
| WO | WO-97/04031 A1 | 2/1997 |
| WO | WO 2005/040283 A2 * | 5/2005 |
| WO | WO-2005/040283 A2 | 5/2005 |
| WO | WO-2005/056690 A1 | 6/2005 |
| WO | WO-2006/037792 A2 | 4/2006 |

OTHER PUBLICATIONS

STIC Search Report dated Jun. 30, 2010.*
U.S. Appl. No. 12/524,003, filed Jun. 17, 2009, Grund et al.

* cited by examiner

*Primary Examiner*—Eisa B Elhilo
(74) *Attorney, Agent, or Firm*—Connolly Bove Lodge & Hutz LLP

(57) ABSTRACT

The present invention provides dyes of the general formula (I)

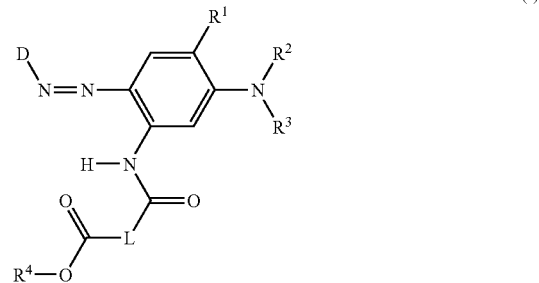

(I)

where
D is the residue of a diazo component;
$R^1$ to $R^7$ and L are each as defined in claim 1, processes for their preparation and their use.

13 Claims, No Drawings

DISPERSION DYE, THE PRODUCTION AND USE THEREOF

CROSS-REFERENCE TO RELATED APPLICATIONS

This application is a national stage application (under 35 U.S.C. §371) of PCT/EP2008/050318, filed Jan. 14, 2008, which claims benefit of German application 10 2007 003372.0, filed Jan. 23, 2007.

BACKGROUND OF THE INVENTION

The present invention relates to disperse azo dyes in which substituents comprising certain ester groups are linked to the chromophore via a linker. Dyes having this structural element are already known and described for example in GB 909843, WO95/20014 and WO05/056690. Similarly, dyes in which such ester groups are linked to the chromophore via an acylamino linker ortho to the azo bridge are known and described in JP58-002352.

It has now been found that disperse azo dyes in which such or similar structural elements are linked in a certain manner have excellent properties and provide dyeings having excellent wash fastnesses and very good sublimation fastnesses.

BRIEF SUMMARY OF THE INVENTION

The present invention is directed to a dye of the formula (I)

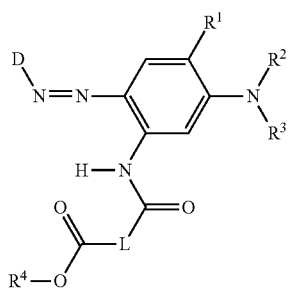

(I)

where
D is the residue of a diazo component;
$R^1$ is hydrogen, $(C_1\text{-}C_6)$-alkyl, $(C_1\text{-}C_4)$-alkoxy or halogen or combines with $R^2$ to form the group —*$CH(CH_3)CH_2C(CH_3)_2$—, where the carbon atom marked by * is attached to the phenyl nucleus;
$R^2$ and $R^3$ independently are hydrogen, $(C_1\text{-}C_6)$-alkyl, substituted $(C_1\text{-}C_6)$-alkyl, $(C_3\text{-}C_4)$-alkenyl or substituted $(C_3\text{-}C_4)$-alkenyl;
$R^4$ is —$CHR^5CN$, —$CHR^6COR^7$ or —$CH=CH_2$;
$R^5$ is hydrogen, $(C_1\text{-}C_6)$-alkyl or substituted $(C_1\text{-}C_6)$-alkyl;
$R^6$ is hydrogen, $(C_1\text{-}C_6)$-alkyl or substituted $(C_1\text{-}C_6)$-alkyl;
$R^7$ is $(C_1\text{-}C_6)$-alkyl, substituted $(C_1\text{-}C_6)$-alkyl, vinyloxy, $(C_1\text{-}C_6)$-alkoxy, substituted $(C_1\text{-}C_6)$-alkoxy, phenoxy, substituted phenoxy, phenyl or substituted phenyl; and
L is $(C_2\text{-}C_6)$-alkylene, oxygen-interrupted $(C_2\text{-}C_6)$-alkylene, $(C_2\text{-}C_6)$-alkenylene, arylene or substituted arylene;

with the proviso that L is not $C_2$-alkylene when $R^5$ is hydrogen.

The present invention is also directed to use of the dye of the formula (I).

DETAILED DESCRIPTION OF THE INVENTION

The present invention provides dyes of the general formula (I)

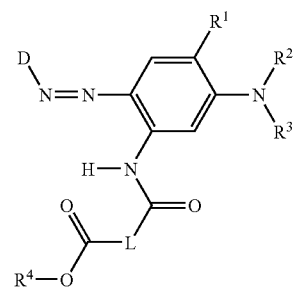

(I)

where
D is the residue of a diazo component;
$R^1$ is hydrogen, $(C_1\text{-}C_6)$-alkyl, $(C_1\text{-}C_4)$-alkoxy or halogen or combines with $R^2$ to form the group —*$CH(CH_3)CH_2C(CH_3)_2$—, where the carbon atom marked by * is attached to the phenyl nucleus;
$R^2$ and $R^3$ independently are hydrogen, $(C_1\text{-}C_6)$-alkyl, substituted $(C_1\text{-}C_6)$-alkyl, $(C_3\text{-}C_4)$-alkenyl or substituted $(C_3\text{-}C_4)$-alkenyl;
$R^4$ is —$CHR^5CN$, —$CHR^6COR^7$ or —$CH=CH_2$;
$R^5$ is hydrogen, $(C_1\text{-}C_6)$-alkyl or substituted $(C_1\text{-}C_6)$-alkyl;
$R^6$ is hydrogen, $(C_1\text{-}C_6)$-alkyl or substituted $(C_1\text{-}C_6)$-alkyl;
$R^7$ is $(C_1\text{-}C_6)$-alkyl, substituted $(C_1\text{-}C_6)$-alkyl, vinyloxy, $(C_1\text{-}C_6)$-alkoxy, substituted $(C_1\text{-}C_6)$-alkoxy, phenoxy, substituted phenoxy, phenyl or substituted phenyl; and
L is $(C_2\text{-}C_6)$-alkylene, oxygen-interrupted $(C_2\text{-}C_6)$-alkylene, $(C_2\text{-}C_6)$-alkenylene, arylene or substituted arylene;

although L shall not be $C_2$-alkylene when $R^5$ is hydrogen.

D residues of a diazo component are in particular those customary in the field of disperse dyes and known to one skilled in the art.

Preferably, D represents a group of the formula (IIa)

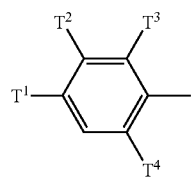

(IIa)

where
$T^1$ and $T^2$ independently are hydrogen, $(C_1\text{-}C_6)$-alkyl, $(C_1\text{-}C_4)$-alkoxy, —$SO_2$—$(C_1\text{-}C_6)$-alkyl, —$SO_2$-aryl, cyano, halogen or nitro; and
$T^3$ and $T^4$ are hydrogen, halogen, cyano, trifluoromethyl, —SCN, —$SO_2CH_3$ or nitro;

although at least one of $T^1$, $T^2$, $T^3$ and $T^4$ is not hydrogen;

or represents a group of the formula (IIb)

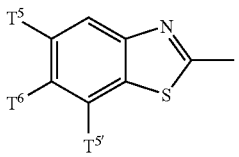

where
$T^5$ and $T^{5'}$ independently are hydrogen, nitro or halogen; and
$T^6$ is hydrogen, —$SO_2CH_3$, —SCN, ($C_1$-$C_4$)-alkoxy, halogen or nitro;

although at least one of $T^5$, $T^{5'}$ and $T^6$ is not hydrogen;

or represents a group of the formula (IIc)

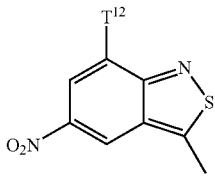

where $T^{12}$ is hydrogen or halogen;

or represents a group of the formula (IId)

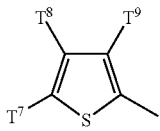

where
$T^7$ is nitro, —CHO, cyano, —$COCH_3$ or a group of the formula

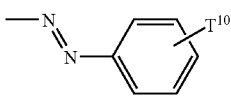

where $T^{10}$ is hydrogen, halogen, nitro or cyano;
$T^8$ is hydrogen, ($C_1$-$C_4$)-alkyl or halogen; and
$T^9$ is nitro, cyano, —$COCH_3$ or —$COOT^{11}$, where $T^{11}$ is ($C_1$-$C_4$)-alkyl;

or represents a group of the formula (IIe)

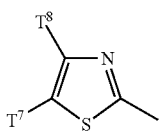

where $T^7$ and $T^8$ are each as defined above, or represents a group of the formula (IIf)

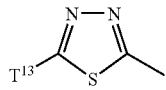

where $T^{13}$ is phenyl or S—($C_1$-$C_4$)-alkyl;

or represents a group of the formula (IIg)

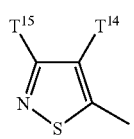

where $T^{14}$ is cyano, —$COCH_3$ or —$COOT^{11}$, where $T^{11}$ is ($C_1$-$C_4$)-alkyl and $T^{15}$ is phenyl or ($C_1$-$C_4$)-alkyl;

or represents a group of the formula (IIh)

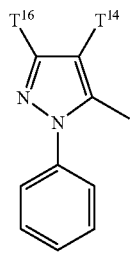

where $T^{14}$ is as defined above and $T^{16}$ is ($C_1$-$C_4$)-alkyl;

or represents a group of the formula (IIi)

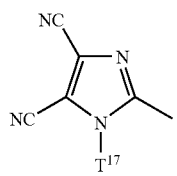

where $T^{17}$ is cyanomethyl, benzyl or allyl;

or represents a group of the formula (IIj)

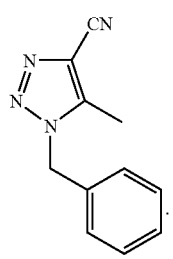

Alkyl groups mentioned in the definitions above and below may be straight chain or branched and are, for example, methyl, ethyl, n-propyl, 1-propyl, n-butyl, i-butyl, tert-butyl, n-pentyl or n-hexyl. A similar logic applies to alkoxy and $(C_2-C_6)$-alkylene. Oxygen-interrupted $(C_2-C_6)$-alkylene conforms in particular to the formula —$(CH_2)_n$—O—$(CH_2)_m$—, where n and m are each a number from 1 to 5 and their sum total is a number from 2 to 6.

Substituted alkyl groups are in particular substituted by 1 to 3 substituents selected from the group consisting of halogen, cyano, hydroxyl, $(C_1-C_6)$-alkoxy, —COO$(C_1-C_6)$-alkyl, —COOaryl, —OCOO$(C_1-C_6)$-alkyl, —OCOOaryl, —OCO$(C_1-C_6)$-alkyl, phenyl, —OCOphenyl and phenoxy.

Alkenyl groups are in particular allyl. Substituted alkenyl groups bear in particular substituents selected from the group consisting of methyl, ethyl and phenyl.

Aryl is in particular phenyl and naphthyl. Arylene is in particular phenylene and naphthylene. When these or phenoxy groups are substituted, they bear one or more, in particular 1, 2 or 3, substituents selected from the group consisting of halogen, $(C_1-C_4)$-alkyl, $(C_1-C_4)$-alkoxy, phenyl, nitro, cyano, trifluoromethyl and —$SO_2$—$CH_3$.

Halogen preferably represents chlorine or bromine.

$R^1$ is preferably hydrogen, chlorine, methyl, ethyl, methoxy or ethoxy.

$R^2$ and $R^3$ independently are preferably hydrogen, methyl, ethyl, n-propyl, n-butyl, cyanoethyl, —$C_2H_4$—$OCOCH_3$, —$C_2H_4$—$OCOC_2H_5$, —$C_2H_4$—$COOCH_3$, —$C_2H_4$—$COOC_2H_5$, methoxyethyl, ethoxyethyl, phenoxyethyl, phenethyl, benzyl or allyl.

$R^5$ and $R^6$ are each more preferably hydrogen.

$R^7$ is preferably methyl, ethyl, vinyloxy, phenyl, methoxy, ethoxy, propoxy, benzyloxy or phenoxy.

L is preferably ethylene, propylene, butylene, ethenylene, butenylene, 1,3-phenylene, 1,4-phenylene or —$CH_2OCH_2$—.

Preferred dyes according to the present invention conform to the general formula (Ia)

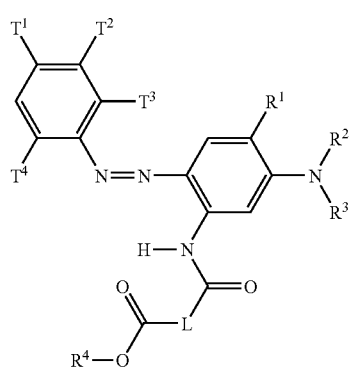

(Ia)

where $T^1$ to $T^4$, $R^1$ to $R^4$ and L are each as defined above.

Particularly preferred dyes of this type according to the present invention conform to the general formula (Iaa)

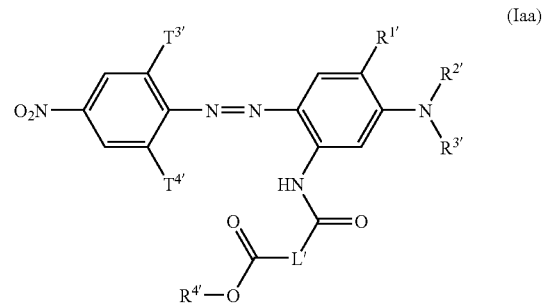

(Iaa)

where $T^3$ is hydrogen, cyano, chlorine or bromine;

$T^{4'}$ is hydrogen, cyano, nitro, chlorine or bromine;

$R^{1'}$ is hydrogen or methoxy;

$R^{2'}$ is hydrogen, ethyl, allyl or methoxyethyl;

$R^{3'}$ is ethyl, allyl, methoxyethyl or cyanoethyl;

$R^{4'}$ is cyanomethyl, —$CH_2COR^{7'}$ or —CH=$CH_2$;

$R^{7'}$ is methyl, ethyl, phenyl, methoxy, ethoxy or vinyloxy; and

L' is ethylene, propylene, butylene, 1,3-phenylene, 1,4-phenylene or —$CH_2$—O—$CH_2$—;

although L' shall not be ethylene when $R^{4'}$ is cyanomethyl.

Further preferred dyes according to the present invention conform to the general formula (Ib)

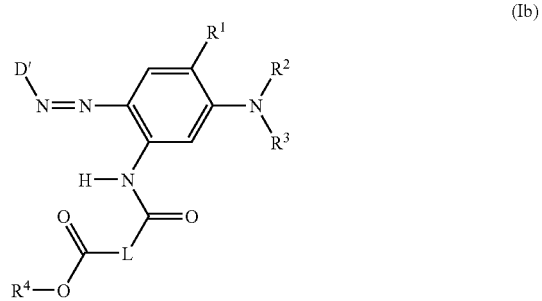

(Ib)

where $R^1$ to $R^4$ and L are each as defined above and D' represents 3,5-dicyano-4-chloro-2-thienyl, 3,5-dicyano-2-thienyl, 3,5-dicyano-4-methyl-2-thienyl, 3-cyano-5-nitro-2-thienyl, 3-cyano-4-chloro-5-formyl-2-thienyl, 3,5-dinitro-2-thienyl, 3-acetyl-5-nitro-2-thienyl, 5-acetyl-3-nitro-2-thienyl, 3-(($C_1-C_4$)-alkoxycarbonyl)-5-nitro-2-thienyl, 5-phenylazo-3-cyano-2-thienyl, 5-(4-nitrophenylazo)-3-cyano-2-thienyl, 5-nitro-2-thiazoyl, 4-chloro-5-formyl-2-thiazolyl, 5-nitro-3-benzisothiazolyl, 7-bromo-5-nitro-3-benzisothiazolyl, 7-chloro-5-nitro-3-benzisothiazolyl, 3-methyl-4-cyano-5-isothiazolyl, 3-phenyl-1,2,4-thiadiazol-2-yl, 5-(($C_1-C_2$)-alkylmercapto))-1,3,4-thiadiazol-2-yl, 1-cyanomethyl-4,5-dicyano-2-imidazolyl, 6-nitrobenzothiazol-2-yl, 5-nitrobenzo-thiazol-2-yl, 6-rhodan-2-benzothiazolyl, 6-chloro-2-benzothiazolyl or (5),6,(7)-dichloro-2-benzothiazolyl.

The dyes of the general formula (I) according to the present invention are obtainable using methods known to one skilled in the art.

For instance, a compound of the general formula (III)

 (III)

where D is as defined above, is diazotized and coupled onto a compound of the general formula (IV)

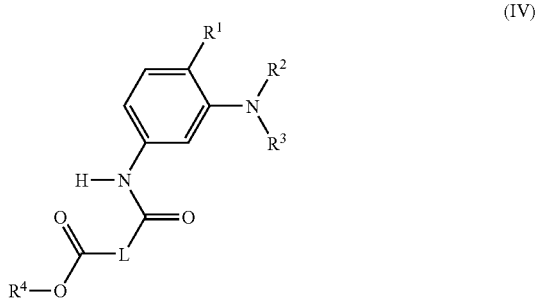 (IV)

where $R^1$ to $R^4$ and L are each as defined above.

The diazotizing of the compounds of the general formula (III) is generally effected in a known manner, for example using sodium nitrite in an aqueous medium rendered acidic, for example with hydrochloric or sulfuric acid, or using nitrosylsulfuric acid in concentrated sulfuric acid, phosphoric acid or in a mixture of acetic acid and propionic acid. The preferred temperature range is between 0° C. and 15° C.

The coupling of the diazotized compounds onto the compounds of the general formula (IV) is generally likewise effected in a known manner, for example in an acidic, aqueous, aqueous-organic or organic medium, particularly advantageously at temperatures below 10° C. Acids used are in particular sulfuric acid, acetic acid or propionic acid.

The compounds of the general formulae (III) and (IV) are known and can be prepared by known methods.

The present invention's dyes of the general formula (I) are very useful for dyeing and printing hydrophobic materials, the dyeings and prints obtained being notable for level hues and high service fastnesses. Deserving of particular mention are excellent wash fastnesses and very good sublimation fastnesses.

The present invention thus also provides for the use of the dyes of the general formula I for dyeing and printing hydrophobic materials, i.e., processes for dyeing or printing such materials in a conventional manner wherein one or more dyes of the general formula (I) according to the present invention are used as a colorant.

The hydrophobic materials mentioned may be of synthetic or semisynthetic origin. Useful hydrophobic materials include for example secondary cellulose acetate, cellulose triacetate, polyamides, polylactides and, in particular, high molecular weight polyesters. Materials of high molecular weight polyester are in particular those based on polyethylene terephthalates and polytrimethylene terephthalates. Also contemplated are blend fabrics and blend fibers consisting of polyester-cotton or polyester-elastane.

The hydrophobic synthetic materials can be present in the form of films or sheet- or threadlike constructions and can have been processed, for example, into yarns or into woven or knit textile materials. Preference is given to fibrous textile materials, which may also be present in the form of microfibers for example.

The dyeing in accordance with the use provided by the present invention can be carried out in a conventional manner, preferably from an aqueous dispersion, if appropriate in the presence of carriers, at between 80 to about 110° C. by the exhaust process or by the HT process in a dyeing autoclave at 110 to 140° C., and also by the so-called thermofix process, in which the fabric is padded with the dyeing liquor and subsequently fixed/set at about 180 to 230° C.

Printing of the materials mentioned can be carried out in a manner known per se by incorporating the dye of the general formula (I) of the present invention in a print paste and treating the fabric printed therewith at temperatures between 180 to 230° C. with HT steam, high-pressure steam or dry heat, if appropriate in the presence of a carrier, to fix the dye.

The dyes of the general formula (I) of the present invention shall be in a very fine state of subdivision when they are used in dyeing liquors, padding liquors or print pastes.

The dyes are converted into the fine state of subdivision in a conventional manner by slurrying the as-fabricated dye together with dispersants in a liquid medium, preferably in water, and subjecting the mixture to the action of shearing forces to mechanically comminute the original dye particles to such an extent that an optimal specific surface area is achieved and sedimentation of the dye is minimized. This is accomplished in suitable mills, such as ball or sand mills. The particle size of the dyes is generally between 0.5 and 5 µm and preferably equal to about 1 µm.

The dispersants used in the milling operation can be nonionic or anionic. Nonionic dispersants include for example reaction products of alkylene oxides, for example ethylene oxide or propylene oxide, with alkylatable compounds, for example fatty alcohols, fatty amines, fatty acids, phenols, alkylphenols and carboxamides. Anionic dispersants are for example lignosulfonates, alkyl- or alkylarylsulfonates or alkylaryl polyglycol ether sulfates.

The dye preparations thus obtained shall be pourable for most applications. Accordingly, the dye and dispersant content is limited in these cases. In general, the dispersions are adjusted to a dye content up to 50 percent by weight and a dispersant content up to about 25 percent by weight. For economic reasons, dye contents are in most cases not allowed to be below 15 percent by weight.

The dispersions may also contain still further auxiliaries, for example those which act as an oxidizing agent, for example sodium m-nitrobenzenesulfonate, or fungicidal agents, for example sodium o-phenylphenoxide and sodium pentachlorophenoxide, and particularly so-called "acid donors", examples being butyrolactone, monochloroacetamide, sodium chloroacetate, sodium dichloroacetate, the sodium salt of 3-chloropropionic acid, monosulfate esters such as lauryl sulfate for example, and also sulfuric esters of ethoxylated and propoxylated alcohols, for example butylglycol sulfate.

The dye dispersions thus obtained are very advantageous for making up dyeing liquors and print pastes.

There are certain fields of use where powder formulations are preferred. These powders comprise the dye, dispersants and other auxiliaries, for example wetting, oxidizing, preserving and dustproofing agents and the abovementioned "acid donors".

A preferred method of making pulverulent preparations of dye consists in stripping the above-described liquid dye dispersions of their liquid, for example by vacuum drying, freeze drying, by drying on drum dryers, but preferably by spray drying.

The dyeing liquors are made by diluting the requisite amounts of the above-described dye formulations with the dyeing medium, preferably water, such that a liquor ratio of 5:1 to 50:1 is obtained for dyeing. In addition, it is generally customary to include further dyeing auxiliaries, such as dispersing, wetting and fixing auxiliaries, in the liquors. Organic and inorganic acids such as acetic acid, succinic acid, boric acid or phosphoric acid are included to set a pH in the range from 4 to 5, preferably 4.5. It is advantageous to buffer the pH setting and to add a sufficient amount of a buffering system. The acetic acid/sodium acetate system is an example of an advantageous buffering system.

To use the dye or dye mixture in textile printing, the requisite amounts of the abovementioned dye formulations are kneaded in a conventional manner together with thickeners, for example alkali metal alginates or the like, and if appropriate further additives, for example fixation accelerants, wetting agents and oxidizing agents, to give print pastes.

The present invention also provides inks for digital textile printing by the ink jet process, comprising a present invention dye of the general formula (I).

The inks of the present invention are preferably aqueous and comprise one or more of the present invention's dyes of the general formula (I), for example in amounts of 0.1% to 50% by weight, preferably in amounts of 1% to 30% by weight and more preferably in amounts of 1% to 15% by weight based on the total weight of the ink. They further comprise in particular from 0.1% to 20% by weight of a dispersant. Suitable dispersants are known to one skilled in the art, are commercially available and include for example sulfonated or sulfomethylated lignins, condensation products of aromatic sulfonic acids and formaldehyde, condensation products of substituted or unsubstituted phenol and formaldehyde, polyacrylates and corresponding copolymers, modified polyurethanes and reaction products of alkylene oxides with alkylatable compounds, for example fatty alcohols, fatty amines, fatty acids, carboxamides and substituted or unsubstituted phenols.

The inks of the present invention may further comprise customary additives, for example viscosity moderators to set viscosities in the range from 1.5 to 40.0 mPas in a temperature range of 20 to 50° C. Preferred inks have a viscosity in the range from 1.5 to 20 mPas and particularly preferred inks have a viscosity in the range from 1.5 to 15 mPas.

Useful viscosity moderators include rheological additives, for example polyvinyl-caprolactam, polyvinylpyrrolidone and also their copolymers, polyetherpolyol, associative thickeners, polyureas, sodium alginates, modified galactomannans, polyetherurea, polyurethane and nonionic cellulose ethers.

By way of further additives, the inks of the present invention may include surface-active substances to set surface tensions in the range from 20 to 65 mN/m, which are if appropriate adapted depending on the process used (thermal or piezo technology). Useful surface-active substances include for example surfactants of any kind, preferably nonionic surfactants, butyldiglycol and 1,2 hexanediol.

The inks may further include customary additives, for example chemical species to inhibit fungal and bacterial growth in amounts from 0.01% to 1% by weight based on the total weight of the ink.

The inks of the present invention can be prepared in conventional manner by mixing the components in water.

Example 1

5.2 g of 6-bromo-2,4-dinitroaniline are introduced into a mixture of 9.8 ml of sulfuric acid (96%), 0.5 ml of water and 3.5 ml of nitrosylsulfuric acid (40%) at 30 to 35° C. After 3 hours of stirring at 30-35° C., excess nitrite is destroyed with amidosulfonic acid. The diazonium salt solution thus obtained is expeditiously added dropwise to a mixture of 6.4 g of 2-oxopropyl N-(3-diethylaminophenyl)succinamate, 50 ml of methanol and 200 g of ice. After stirring for one hour, the solids are filtered off with suction, washed with water and dried to leave 10.7 g of 2-oxopropyl N-[2-(2-bromo-4,6-dinitrophenylazo)-5-diethylaminophenyl]succinamate of the formula (Iab)

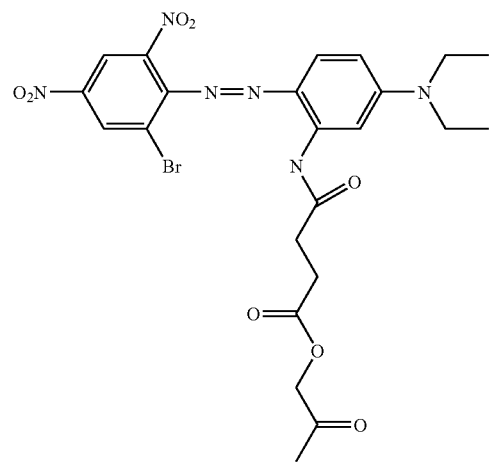

(Iab)

($\lambda_{max}$[DMF]=556 nm), which dyes polyester in violet shades and has excellent wash and sublimation fastnesses.

Example 2

5.9 g of 2-oxopropyl N-[2-(2-bromo-4,6-dinitrophenylazo)-5-diethylaminophenl]-succinamate (Iab) and 0.9 g of copper(I) cyanide are stirred in 30 ml of N-methylpyrrolidone at 80° C. for 4 hours. After cooling, 200 ml of methanol and 50 ml of water are added dropwise to the batch. The precipitate is filtered off with suction, washed with 5% hydrochloric acid and water and dried under reduced pressure to leave 4.8 g of the dye of the formula (Iac)

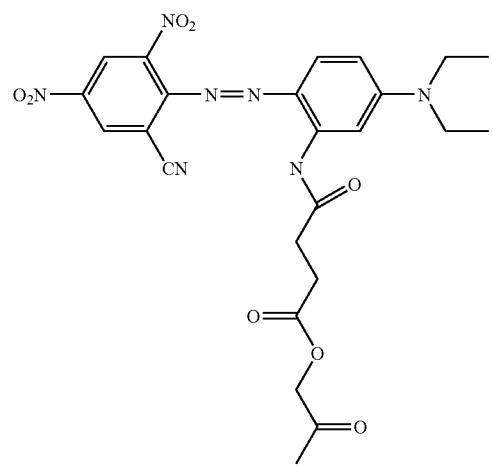

(Iac)

($\lambda_{max}$[DMF]=588 nm), which dyes polyester in brilliant, blue shades and has excellent wash and sublimation fastnesses.

Examples 3 to 98

Further inventive dyes obtainable by the above method are indicated in Table 1.

TABLE 1

[Structure: nitro-substituted phenyl-azo-phenyl dye with substituents $T^3$, $T^4$ on one ring, $R^1$, $NR^2R^3$ on the other ring, and an HN-C(=O)-L-C(=O)-O-$R^4$ amide side chain]

| Example | $T^3$ | $T^4$ | $R^1$ | $R^4$ | L | $R^2$ | $R^3$ | $\lambda_{max}$ *[DMF] [acetone] |
|---|---|---|---|---|---|---|---|---|
| 3 | Br | CN | H | $CH_2COC_6H_5$ | $C_2H_4$ | $C_2H_5$ | $C_2H_5$ | *592 |
| 4 | Cl | $NO_2$ | H | $CH_2COC_6H_5$ | $C_2H_4$ | $C_2H_5$ | $C_2H_5$ | *566 |
| 5 | Br | $NO_2$ | H | $CH_2COC_6H_5$ | $C_2H_4$ | $C_2H_5$ | $C_2H_5$ | *556 |
| 6 | CN | CN | H | $CH_2COCH_3$ | $C_2H_4$ | $C_2H_5$ | $C_2H_5$ | *600 |
| 7 | Br | Br | H | $CH_2COCH_3$ | $C_2H_4$ | $C_2H_5$ | $C_2H_5$ | *468 |
| 8 | Cl | $NO_2$ | H | $CH_2COCH_3$ | $C_2H_4$ | $C_2H_5$ | $C_2H_5$ | *566 |
| 9 | Br | CN | H | $CH_2COCH_3$ | $C_2H_4$ | $C_2H_5$ | $C_2H_5$ | *590 |
| 10 | Cl | H | H | $CH_2COCH_3$ | $C_2H_4$ | $C_2H_5$ | $C_2H_5$ | *540 |
| 11 | Cl | $NO_2$ | $OCH_3$ | $CH_2COC_6H_5$ | $C_2H_4$ | $C_2H_5$ | $C_2H_5$ | *616 |
| 12 | Br | $NO_2$ | $OCH_3$ | $CH_2COC_6H_5$ | $C_2H_4$ | $C_2H_5$ | $C_2H_5$ | *616 |
| 13 | H | $NO_2$ | $OCH_3$ | $CH_2COC_6H_5$ | $C_2H_4$ | $C_2H_5$ | $C_2H_5$ | *596 |
| 14 | CN | Br | $OCH_3$ | $CH_2COC_6H_5$ | $C_2H_4$ | $C_2H_5$ | $C_2H_5$ | *644 |
| 15 | Cl | $NO_2$ | $OCH_3$ | $CH_2COCH_3$ | $C_2H_4$ | $C_2H_5$ | $C_2H_5$ | *616 |
| 16 | Br | $NO_2$ | $OCH_3$ | $CH_2COCH_3$ | $C_2H_4$ | $C_2H_5$ | $C_2H_5$ | *616 |
| 17 | H | $NO_2$ | $OCH_3$ | $CH_2COCH_3$ | $C_2H_4$ | $C_2H_5$ | $C_2H_5$ | *594 |
| 18 | CN | Br | $OCH_3$ | $CH_2COCH_3$ | $C_2H_4$ | $C_2H_5$ | $C_2H_5$ | *644 |
| 19 | Br | $NO_2$ | H | $CH_2COCH_3$ | $C_3H_6$ | $C_2H_5$ | $C_2H_5$ | *558 |
| 20 | Cl | $NO_2$ | $OCH_3$ | $CH_2COCH_3$ | $C_3H_6$ | $C_2H_5$ | $C_2H_5$ | *616 |
| 21 | Br | $NO_2$ | $OCH_3$ | $CH_2COCH_3$ | $C_3H_6$ | $C_2H_5$ | $C_2H_5$ | *616 |
| 22 | H | $NO_2$ | $OCH_3$ | $CH_2COCH_3$ | $C_3H_6$ | $C_2H_5$ | $C_2H_5$ | *596 |
| 23 | Cl | $NO_2$ | $OCH_3$ | $CH_2COCH_2CH_3$ | $C_3H_6$ | $C_2H_5$ | $C_2H_5$ | *616 |
| 24 | H | $NO_2$ | $OCH_3$ | $CH_2COCH_2CH_3$ | $C_3H_6$ | $C_2H_5$ | $C_2H_5$ | *596 |
| 25 | CN | Br | $OCH_3$ | $CH_2COCH_3$ | $C_3H_6$ | $C_2H_5$ | $C_2H_5$ | *644 |
| 26 | Cl | $NO_2$ | $OCH_3$ | $CH_2COCH_3$ | $CH_2OCH_2$ | $C_2H_5$ | $C_2H_5$ | *614 |
| 27 | Br | $NO_2$ | $OCH_3$ | $CH_2COCH_3$ | $CH_2OCH_2$ | $C_2H_5$ | $C_2H_5$ | *612 |
| 28 | H | $NO_2$ | $OCH_3$ | $CH_2COCH_3$ | $CH_2OCH_2$ | $C_2H_5$ | $C_2H_5$ | *594 |
| 29 | Br | $NO_2$ | H | $CH_2COCH_3$ | $CH_2OCH_2$ | $C_2H_5$ | $C_2H_5$ | *556 |
| 30 | Cl | $NO_2$ | $OCH_3$ | $CH_2CN$ | $C_3H_6$ | $C_2H_5$ | $C_2H_5$ | 616 |
| 31 | Br | $NO_2$ | $OCH_3$ | $CH_2CN$ | $C_3H_6$ | $C_2H_5$ | $C_2H_5$ | 614 |
| 32 | H | $NO_2$ | $OCH_3$ | $CH_2CN$ | $C_3H_6$ | $C_2H_5$ | $C_2H_5$ | 596 |
| 33 | Br | CN | $OCH_3$ | $CH_2CN$ | $C_3H_6$ | $C_2H_5$ | $C_2H_5$ | 644 |
| 34 | Br | $NO_2$ | $OCH_3$ | $CH_2COOCH_3$ | $C_3H_6$ | $C_2H_5$ | $C_2H_5$ | 616 |
| 35 | Br | $NO_2$ | $OCH_3$ | $CH_2COOCH_3$ | $C_3H_6$ | H | $C_2H_4CN$ | 582 |
| 36 | Br | $NO_2$ | $OCH_3$ | $CH_2CN$ | $C_3H_6$ | $C_2H_5$ | $C_2H_4CN$ | 592 |
| 37 | Cl | $NO_2$ | H | $CH_2CN$ | $C_3H_6$ | $C_2H_5$ | $C_2H_5$ | 568 |
| 38 | Br | $NO_2$ | H | $CH_2CN$ | $C_3H_6$ | $C_2H_5$ | $C_2H_5$ | 558 |
| 39 | H | H | H | $CH_2CN$ | $C_3H_6$ | $C_2H_5$ | $C_2H_5$ | 514 |
| 40 | H | $NO_2$ | H | $CH_2CN$ | $C_3H_6$ | $C_2H_5$ | $C_2H_5$ | 536 |
| 41 | H | H | H | $CH_2CN$ | $C_3H_6$ | $C_2H_5$ | $C_2H_4CN$ | 495 |
| 42 | Cl | Br | H | $CH_2CN$ | $C_3H_6$ | $C_2H_5$ | $C_2H_5$ | 495 |
| 43 | Cl | H | H | $CH_2CN$ | $C_3H_6$ | $C_2H_5$ | $C_2H_5$ | 542 |
| 44 | CN | H | H | $CH_2CN$ | $C_3H_6$ | $C_2H_5$ | $C_2H_5$ | 552 |
| 45 | Cl | Cl | H | $CH_2CN$ | $C_3H_6$ | $C_2H_5$ | $C_2H_5$ | 478 |
| 46 | CN | Br | H | $CH_2CN$ | $C_3H_6$ | $C_2H_5$ | $C_2H_5$ | 592 |
| 47 | Cl | H | H | $CH_2CN$ | $C_3H_6$ | $C_2H_5$ | $C_2H_4CN$ | 524 |
| 48 | CN | H | H | $CH_2CN$ | $C_3H_6$ | $C_2H_5$ | $C_2H_4CN$ | 540 |
| 49 | Cl | Cl | H | $CH_2CN$ | $C_3H_6$ | $C_2H_5$ | $C_2H_4CN$ | 464 |
| 50 | Br | CN | H | $CH_2CN$ | $C_3H_6$ | $C_2H_5$ | $C_2H_4CN$ | 580 |
| 51 | Cl | $NO_2$ | H | $CH_2CN$ | $C_3H_6$ | $C_2H_4OCH_3$ | $C_2H_4OCH_3$ | 536 |
| 52 | Br | $NO_2$ | H | $CH_2CN$ | $C_3H_6$ | $C_2H_4OCH_3$ | $C_2H_4OCH_3$ | 553 |
| 53 | H | $NO_2$ | H | $CH_2CN$ | $C_3H_6$ | $C_2H_4OCH_3$ | $C_2H_4OCH_3$ | 536 |
| 54 | Cl | Cl | H | $CH_2CN$ | $C_3H_6$ | $C_2H_4OCH_3$ | $C_2H_4OCH_3$ | 491 |
| 55 | Cl | H | H | $CH_2CN$ | $C_3H_6$ | $C_2H_4OCH_3$ | $C_2H_4OCH_3$ | 524 |

TABLE 1-continued

| Example | T³ | T⁴ | R¹ | R⁴ | L | R² | R³ | $\lambda_{max}$ *[DMF] [acetone] |
|---|---|---|---|---|---|---|---|---|
| 56 | CN | H | H | CH₂CN | C₃H₆ | C₂H₄OCH₃ | C₂H₄OCH₃ | 545 |
| 57 | Cl | NO₂ | OCH₃ | CH₂CN | C₃H₆ | C₂H₄OCH₃ | C₂H₄OCH₃ | 590 |
| 58 | Cl | NO₂ | H | CH₂CN | C₃H₆ | CH₂CH=CH₂ | CH₂CH=CH₂ | 547 |
| 59 | Cl | NO₂ | H | CH₂CN | C₃H₆ | CH₂CH=CH₂ | CH₂CH=CH₂ | 547 |
| 60 | Br | NO₂ | H | CH₂CN | C₃H₆ | CH₂CH=CH₂ | CH₂CH=CH₂ | 545 |
| 61 | H | NO₂ | H | CH₂CN | C₃H₆ | CH₂CH=CH₂ | CH₂CH=CH₂ | 535 |
| 62 | Cl | Cl | H | CH₂CN | C₃H₆ | CH₂CH=CH₂ | CH₂CH=CH₂ | 484 |
| 63 | Cl | H | H | CH₂CN | C₃H₆ | CH₂CH=CH₂ | CH₂CH=CH₂ | 520 |
| 64 | CN | H | H | CH₂CN | C₃H₆ | CH₂CH=CH₂ | CH₂CH=CH₂ | 536 |
| 65 | Cl | NO₂ | OCH₃ | CH₂CN | C₃H₆ | CH₂CH=CH₂ | CH₂CH=CH₂ | 594 |
| 66 | H | NO₂ | OCH₃ | CH₂CN | C₃H₆ | CH₂CH=CH₂ | CH₂CH=CH₂ | 574 |
| 67 | Cl | NO₂ | H | CH₂CN | C₄H₉ | C₂H₅ | C₂H₅ | 560 |
| 68 | Br | NO₂ | H | CH₂CN | C₄H₉ | C₂H₅ | C₂H₅ | 559 |
| 69 | H | NO₂ | H | CH₂CN | C₄H₉ | C₂H₅ | C₂H₅ | 536 |
| 70 | H | CN | H | CH₂CN | C₄H₉ | C₂H₅ | C₂H₅ | 550 |
| 71 | H | Cl | H | CH₂CN | C₄H₉ | C₂H₅ | C₂H₅ | 533 |
| 72 | Cl | Cl | H | CH₂CN | C₄H₉ | C₂H₅ | C₂H₅ | 498 |
| 73 | CN | H | H | CH₂COOCH₃ | C₃H₆ | C₂H₅ | C₂H₄CN | 540 |
| 74 | Cl | H | H | CH₂COOCH₃ | C₃H₆ | C₂H₅ | C₂H₄CN | 524 |
| 75 | Cl | Cl | H | CH₂COOCH₃ | C₃H₆ | C₂H₅ | C₂H₄CN | 464 |
| 76 | Br | NO₂ | H | CH₂COOCH₃ | C₃H₆ | C₂H₅ | C₂H₅ | 556 |
| 77 | H | NO₂ | OCH₃ | CH₂COOCH=CH₂ | C₂H₄ | C₂H₅ | C₂H₅ | *594 |
| 78 | Br | NO₂ | OCH₃ | CH₂COOCH=CH₂ | C₂H₄ | C₂H₅ | C₂H₅ | *614 |
| 79 | Cl | NO₂ | OCH₃ | CH₂COOCH=CH₂ | C₂H₄ | C₂H₅ | C₂H₅ | *616 |
| 80 | H | NO₂ | OCH₃ | CH₂COOCH=CH₂ | C₃H₆ | C₂H₅ | C₂H₅ | *596 |
| 81 | Br | NO₂ | OCH₃ | CH₂COOCH=CH₂ | C₃H₆ | C₂H₅ | C₂H₅ | *616 |
| 82 | Cl | NO₂ | OCH₃ | CH₂COOCH=CH₂ | C₃H₆ | C₂H₅ | C₂H₅ | *616 |
| 83 | H | NO₂ | OCH₃ | CH=CH₂ | C₂H₄ | C₂H₅ | C₂H₅ | *594 |
| 84 | Br | NO₂ | OCH₃ | CH=CH₂ | C₂H₄ | C₂H₅ | C₂H₅ | *614 |
| 85 | Cl | NO₂ | OCH₃ | CH=CH₂ | C₂H₄ | C₂H₅ | C₂H₅ | *616 |
| 86 | H | NO₂ | OCH₃ | CH=CH₂ | C₃H₆ | C₂H₅ | C₂H₅ | *596 |
| 87 | Br | NO₂ | OCH₃ | CH=CH₂ | C₃H₆ | C₂H₅ | C₂H₅ | *616 |
| 88 | Cl | NO₂ | OCH₃ | CH=CH₂ | C₃H₆ | C₂H₅ | C₂H₅ | *616 |
| 89 | Cl | NO₂ | H | CH₂CN | 1,4-phenylene | C₂H₅ | C₂H₅ | 558 |
| 90 | Br | NO₂ | H | CH₂CN | 1,4-phenylene | C₂H₅ | C₂H₅ | 551 |
| 91 | Cl | H | H | CH₂CN | 1,4-phenylene | C₂H₅ | C₂H₅ | 538 |
| 92 | Cl | Cl | H | CH₂CN | 1,4-phenylene | C₂H₅ | C₂H₅ | 472 |
| 93 | Cl | NO₂ | H | CH₂CN | 1,3-phenylene | C₂H₅ | C₂H₅ | 560 |
| 94 | H | NO₂ | H | CH₂CN | 1,3-phenylene | C₂H₅ | C₂H₅ | 510 |
| 95 | H | CN | H | CH₂CN | 1,3-phenylene | C₂H₅ | C₂H₅ | 550 |
| 96 | Cl | NO₂ | H | CH₂COCH₃ | 1,3-phenylene | C₂H₅ | C₂H₅ | 560 |
| 97 | Cl | NO₂ | OCH₃ | CH₂COCH₃ | 1,3-phenylene | C₂H₅ | C₂H₅ | 605 |
| 98 | Cl | NO₂ | OCH₃ | CH₂CN | 1,3-phenylene | C₂H₅ | C₂H₅ | 605 |

Example 99

4.7 g of 2-amino-3,5-dinitrothiophene are introduced at 15° C. into a mixture of 8.0 ml of sulfuric acid (96%), 0.5 ml of water and 9.4 g of nitrosylsulfuric acid (40%). After 1 hour of stirring at −5° C., excess nitrite is destroyed with amidosulfonic acid. The diazonium salt solution thus obtained is expeditiously added dropwise to a mixture of 7.9 g of cyanomethyl 4-(3-diethylaminophenylcarbamoyl)butyrate, 40 ml of methanol and 200 g of ice. After stirring for one hour, the solids are filtered off with suction, washed with water and dried to leave 7.0 g of cyanomethyl 4-[5-diethylamino-2-(3,5-dinitrothiophen-2-ylazo)phenylcarbamoyl]butyrate of the formula (Iba)

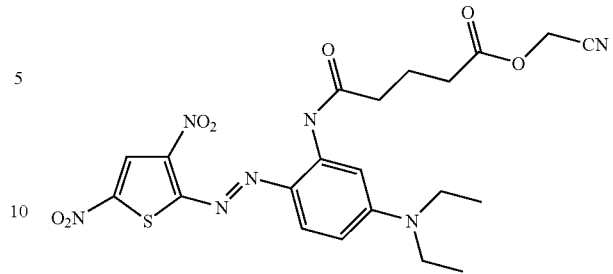

(Iba)

($\lambda_{max}$[acetone]=635 nm), which dyes polyester in greenish-blue shades and has excellent wash and sublimation fastnesses.

Examples 100 to 104

Further inventive dyes obtainable by the above method are indicated in Table 2.

TABLE 2

| Example | D | $R^1$ | $R^2$ | $R^3$ | $R^4$ | L | $\lambda_{max}$ [acetone] |
|---|---|---|---|---|---|---|---|
| 100 | 5-nitro-3-methyl-2,1-benzisothiazole | H | $CH_2CH_3$ | $CH_2CH_3$ | $CH=CH_2$ | $C_2H_4$ | 617 |
| 101 | 5-nitro-3-methyl-2,1-benzisothiazole | H | $CH_2CH_3$ | $CH_2CH_3$ | $CH_2COCH_3$ | $C_2H_4$ | 617 |
| 102 | 5-nitro-3-methyl-2,1-benzisothiazole | H | $CH_2CH_3$ | $CH_2CH_3$ | $CH_2CN$ | $C_3H_6$ | 617 |
| 103 | 6-nitro-2-methylbenzothiazole | H | $CH_2CH_3$ | $CH_2CH_3$ | $CH_2CN$ | $C_3H_6$ | 553 |
| 104 | 5,6-dichloro-2-methylbenzothiazole | H | $CH_2CH_3$ | $CH_2CH_3$ | $CH_2CN$ | $C_3H_6$ | 535 |

Example 105

A textile fabric consisting of polyester is padded with a liquor consisting of 50 of 8% sodium alginate solution, 100 g/l of 8-12% carob flour ether solution and 5 g/l of monosodium phosphate in water and then dried. The wet pickup is 70%.

The textile thus pretreated is then printed with an aqueous ink prepared in accordance with the procedure described above and containing 3.5% of the dye of Example 1, 2.5% of Disperbyk 190 dispersant, 30% of 1,5-pentanediol, 5% of diethylene glycol monomethyl ether, 0.01% of Mergal K9N biocide, and 58.99% of water using a drop-on-demand (piezo) ink jet print head. The print is fully dried. Fixing is effected by means of superheated steam at 175° C. for 7 minutes. The print is subsequently subjected to an alkaline reduction clear, rinsed warm and then dried.

We claim:

1. A dye of the formula (I)

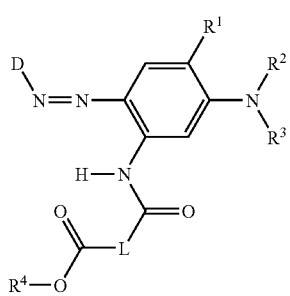
(I)

wherein

D is the residue of a diazo component;

$R^1$ is hydrogen, $(C_1-C_6)$-alkyl, $(C_1-C_4)$-alkoxy or halogen or combines with $R^2$ to form the group —*CH(CH$_3$)CH$_2$C(CH$_3$)$_2$—, where the carbon atom marked by * is attached to the phenyl nucleus;

$R^2$ and $R^3$ independently are hydrogen, $(C_1-C_6)$-alkyl, substituted $(C_1-C_6)$-alkyl, $(C_3-C_4)$-alkenyl or substituted $(C_3-C_4)$-alkenyl;

$R^4$ is —CHR$^5$CN, —CHR$^6$COR$^7$ or —CH=CH$_2$;

$R^5$ is hydrogen, $(C_1-C_6)$-alkyl or substituted $(C_1-C_6)$-alkyl;

$R^6$ is hydrogen, $(C_1-C_6)$-alkyl or substituted $(C_1-C_6)$-alkyl;

$R^7$ is $(C_1-C_6)$-alkyl, substituted $(C_1-C_6)$-alkyl, vinyloxy, $(C_1-C_6)$-alkoxy, substituted $(C_1-C_6)$-alkoxy, phenoxy, substituted phenoxy, phenyl or substituted phenyl; and L is $(C_2-C_6)$-alkylene, oxygen-interrupted $(C_2-C_6)$-alkylene, $(C_2-C_6)$-alkenylene, arylene or substituted arylene; with the proviso that L is not $C_2$-alkylene when $R^5$ is hydrogen.

2. The dye as claimed in claim 1, wherein D represents a group of the formula (IIa)

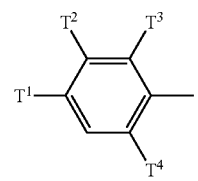
(IIa)

wherein $T^1$ and $T^2$ independently are hydrogen, $(C_1-C_6)$-alkyl, $(C_1-C_4)$-alkoxy, —SO$_2$—$(C_1-C_6)$-alkyl, —SO$_2$-aryl, cyano, halogen or nitro; and $T^3$ and $T^4$ are hydrogen, halogen, cyano, trifluoromethyl, —SCN, —SO$_2$CH$_3$ or nitro;

although at least one of $T^1$, $T^2$, $T^3$ and $T^4$ is not hydrogen;

or represents a group of the formula (IIb)

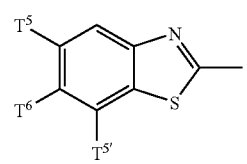
(IIb)

wherein $T^5$ and $T^{5'}$ independently are hydrogen, nitro or halogen; and $T^6$ is hydrogen, —SO$_2$CH$_3$, —SCN, $(C_1-C_4)$-alkoxy, halogen or nitro;

although at least one of $T^5$, $T^{5'}$ and $T^6$ is not hydrogen;

or represents a group of the formula (IIc)

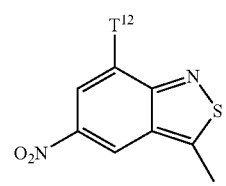
(IIc)

where $T^{12}$ is hydrogen or halogen;

or represents a group of the formula (IId)

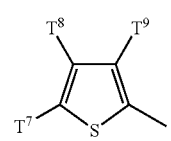
(IId)

where $T^7$ is nitro, —CHO, cyano, —COCH$_3$ or a group of the formula

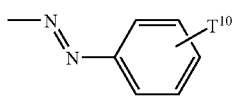

where $T^{10}$ is hydrogen, halogen, nitro or cyano;
$T^8$ is hydrogen, $(C_1-C_4)$-alkyl or halogen; and
$T^9$ is nitro, cyano, —$COCH_3$ or —$COOT^{11}$, where $T^{11}$ is $(C_1-C_4)$-alkyl;
or represents a group of the formula (IIe)

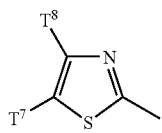
(IIe)

where $T^7$ and $T^8$ are each as defined above,
or represents a group of the formula (IIf)

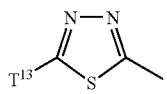
(IIf)

where $T^{13}$ is phenyl or S—$(C_1-C_4)$-alkyl;
or represents a group of the formula (IIg)

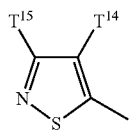
(IIg)

where $T^{14}$ is cyano, —$COCH_3$ or —$COOT^{11}$, where $T^{11}$ is $(C_1-C_4)$-alkyl and $T^{15}$ is phenyl or $(C_1-C_4)$-alkyl;
or represents a group of the formula (IIh)

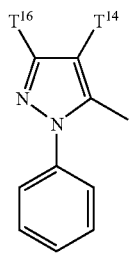
(IIh)

where $T^{14}$ is as defined above and $T^{16}$ is $(C_1-C_4)$-alkyl;

or represents a group of the formula (IIi)

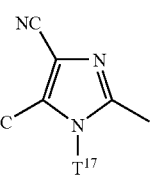
(IIi)

where $T^{17}$ is cyanomethyl, benzyl or allyl;
or represents a group of the formula (IIj)

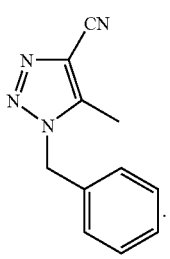
(IIj)

3. The dye as claimed in claim 1, wherein
$R^1$ is hydrogen, chlorine, methyl, ethyl, methoxy or ethoxy;
$R^2$ and $R^3$ independently are hydrogen, methyl, ethyl, n-propyl, n-butyl, cyanoethyl, —$C_2H_4OCOCH_3$, —$C_2H_4OCOC_2H_4$, —$C_2H_4COOCH_3$, —$C_2H_4COOC_2H_5$, methoxyethyl, ethoxyethyl, phenoxyethyl, phenethyl, benzyl or allyl;
$R^5$ and $R^6$ are each hydrogen;
$R^7$ is methyl, ethyl, phenyl, methoxy, ethoxy, propoxy, vinyloxy, benzyloxy or phenoxy; and
L is ethylene, propylene, butylene, ethenylene, butenylene, 1,3-phenylene, 1,4-phenylene or —$CH_2OCH_2$—.

4. The dye as claimed in claim 2, wherein
$R^1$ is hydrogen, chlorine, methyl, ethyl, methoxy or ethoxy;
$R^2$ and $R^3$ independently are hydrogen, methyl, ethyl, n-propyl, n-butyl, cyanoethyl, —$C_2H_4OCOCH_3$, —$C_2H_4OCOC_2H_4$, —$C_2H_4COOCH_3$, —$C_2H_4COOC_2H_5$, methoxyethyl, ethoxyethyl, phenoxyethyl, phenethyl, benzyl or allyl;
$R^5$ and $R^6$ are each hydrogen;
$R^7$ is methyl, ethyl, phenyl, methoxy, ethoxy, propoxy, vinyloxy, benzyloxy or phenoxy; and
L is ethylene, propylene, butylene, ethenylene, butenylene, 1,3-phenylene, 1,4-phenylene or —$CH_2OCH_2$—.

5. The dye as claimed in claim 1, wherein the dye of the formula (I) is of the formula (Ia)

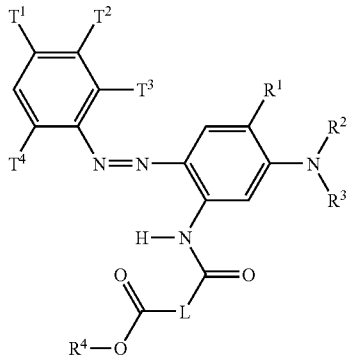

wherein
T$^1$ and T$^2$ independently are hydrogen, (C$_1$-C$_6$)-alkyl, (C$_1$-C$_4$)-alkoxy, —SO$_2$—(C$_1$-C$_6$)-alkyl, —SO$_2$-aryl, cyano, halogen or nitro; and
T$^3$ and T$^4$ are hydrogen, halogen, cyano, trifluoromethyl, —SCN, —SO$_2$CH$_3$ or nitro;
although at least one of T$^1$, T$^2$, T$^3$ and T$^4$ is not hydrogen;
is hydrogen, (C$_1$-C$_6$)-alkyl, (C$_1$-C$_4$)-alkoxy or halogen or combines with R$^2$ to form the group —*CH(CH$_3$)CH$_2$C(CH$_3$)$_2$—, where the carbon atom marked by * is attached to the phenyl nucleus;
R$^2$ and R$^3$ independently are hydrogen, (C$_1$-C$_6$)-alkyl, substituted (C$_1$-C$_6$)-alkyl, (C$_3$-C$_4$)-alkenyl or substituted (C$_3$-C$_4$)-alkenyl;
R$^4$ is —CHR$^5$CN, —CHR$^6$COR$^7$ or —CH=CH$_2$; and
L is (C$_2$-C$_6$)-alkylene, oxygen-interrupted (C$_2$-C$_6$)-alkylene, (C$_2$-C$_6$)-alkenylene, arylene or substituted arylene.

6. The dye as claimed in claim 2, wherein the dye of the formula (I) is of the formula (Ia)

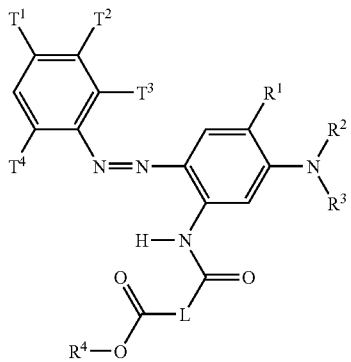

wherein
T$^1$ and T$^2$ independently are hydrogen, (C$_1$-C$_6$)-alkyl, (C$_1$-C$_4$)-alkoxy, —SO$_2$—(C$_1$-C$_6$)-alkyl, —SO$_2$-aryl, cyano, halogen or nitro; and
T$^3$ and T$^4$ are hydrogen, halogen, cyano, trifluoromethyl, —SCN, —SO$_2$CH$_3$ or nitro;
although at least one of T$^1$, T$^2$, T$^3$ and T$^4$ is not hydrogen;
is hydrogen, (C$_1$-C$_6$)-alkyl, (C$_1$-C$_4$)-alkoxy or halogen or combines with R$^2$ to form the group —*CH(CH$_3$)CH$_2$C(CH$_3$)$_2$—, where the carbon atom marked by * is attached to the phenyl nucleus;
R$^2$ and R$^3$ independently are hydrogen, (C$_1$-C$_6$)-alkyl, substituted (C$_1$-C$_6$)-alkyl, (C$_3$-C$_4$)-alkenyl or substituted (C$_3$-C$_4$)-alkenyl;
R$^4$ is —CHR$^5$CN, —CHR$^6$COR$^7$ or —CH=CH$_2$; and
L is (C$_2$-C$_6$)-alkylene, oxygen-interrupted (C$_2$-C$_6$)-alkylene, (C$_2$-C$_6$)-alkenylene, arylene or substituted arylene.

7. The dye as claimed in claim 5, wherein the dye of the formula (I) is of the formula (Iaa)

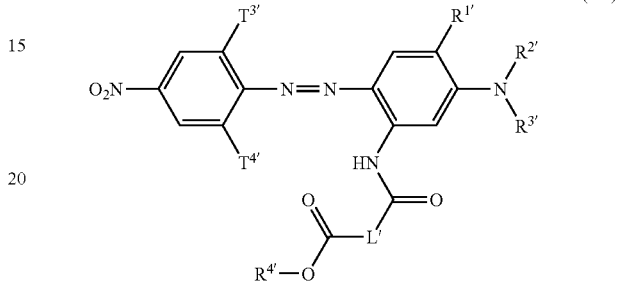

wherein
T$^{3'}$ is hydrogen, cyano, chlorine or bromine;
T$^{4'}$ is hydrogen, cyano, nitro, chlorine or bromine;
R$^{1'}$ is hydrogen or methoxy;
R$^{2'}$ is hydrogen, ethyl, allyl or methoxyethyl;
R$^{3'}$ is ethyl, allyl, methoxyethyl or cyanoethyl;
R$^{4'}$ is cyanomethyl, —CH$_2$COR$^{7'}$ or —CH=CH$_2$;
R$^{7'}$ is methyl, ethyl, phenyl, methoxy, ethoxy or vinyloxy; and
L' is ethylene, propylene, butylene, 1,3-phenylene, 1,4-phenylene or —CH$_2$—O—CH$_2$—;
with the proviso that L' shall not be ethylene when R$^{4'}$ is cyanomethyl.

8. The dye as claimed in claim 6, wherein the dye of the formula (I) is of the formula (Iaa)

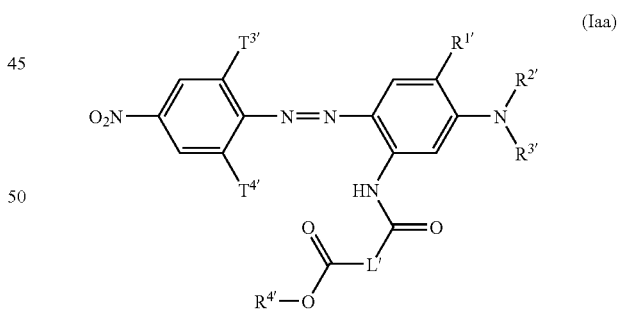

wherein
T$^{3'}$ is hydrogen, cyano, chlorine or bromine;
T$^{4'}$ is hydrogen, cyano, nitro, chlorine or bromine;
R$^{1'}$ is hydrogen or methoxy;
R$^{2'}$ is hydrogen, ethyl, allyl or methoxyethyl;
R$^{3'}$ is ethyl, allyl, methoxyethyl or cyanoethyl;
R$^{4'}$ is cyanomethyl, —CH$_2$COR$^{7'}$ or —CH=CH$_2$;
R$^{7'}$ is methyl, ethyl, phenyl, methoxy, ethoxy or vinyloxy; and
L' is ethylene, propylene, butylene, 1,3-phenylene, 1,4-phenylene or —CH$_2$—O—CH$_2$—;

with the proviso that L' shall not be ethylene when R⁴' is cyanomethyl.

9. The dye as claimed in claim 1, wherein the dye of the formula (I) is of the formula (Ib)

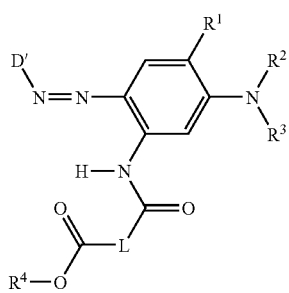

(Ib)

wherein

R¹ is hydrogen, $(C_1-C_6)$-alkyl, $(C_1-C_4)$-alkoxy or halogen or combines with R² to form the group —*CH(CH₃)CH₂C(CH₃)₂—, where the carbon atom marked by * is attached to the phenyl nucleus;

R² and R³ independently are hydrogen, $(C_1-C_6)$-alkyl, substituted $(C_1-C_6)$-alkyl, $(C_3-C_4)$-alkenyl or substituted $(C_3-C_4)$-alkenyl;

R⁴ is —CHR⁵CN, —CHR⁶COR⁷ or —CH=CH₂; and

L is $(C_2-C_6)$-alkylene, oxygen-interrupted $(C_2-C_6)$-alkylene, $(C_2-C_6)$-alkenylene, arylene or substituted arylene and D' is 3,5-dicyano-4-chloro-2-thienyl, 3,5-dicyano-2-thienyl, 3,5-dicyano-4-methyl-2-thienyl, 3-cyano-5-nitro-2-thienyl, 3-cyano-4-chloro-5-formyl-2-thienyl, dinitro-2-thienyl, 3-acetyl-5-nitro-2-thienyl, 5-acetyl-3-nitro-2-thienyl, 3-(($C_1-C_4$)-alkoxycarbonyl)-5-nitro-2-thienyl, 5-phenylazo-3-cyano-2-thienyl, 5-(4-nitrophenylazo)-3-cyano-2-thienyl, 5-nitro-2-thiazoyl, 4-chloro-5-formyl-2-thiazolyl, 5-nitro-3-benzisothiazolyl, 7-bromo-5-nitro-3-benzisothiazolyl, 7-chloro-5-nitro-3-benzisothiazolyl, 3-methyl-4-cyano-5-isothiazolyl, 3-phenyl-1,2,4-thiadiazol-2-yl, 5-(($C_1-C_2$)-alkylmercapto))-1,3,4-thiadiazol-2-yl, 1-cyanomethyl-4,5-dicyano-2-imidazolyl, 6-nitrobenzothiazol-2-yl, 5-nitrobenzothiazol-2-yl, 6-rhodan-2-benzothiazolyl, 6-chloro-2-benzothiazolyl or (5),6,(7)-dichloro-2-benzothiazolyl.

10. The dye as claimed in claim 2, wherein the dye of the formula (I) is of the formula (Ib)

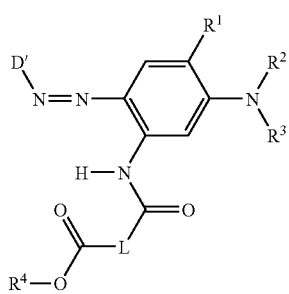

(Ib)

wherein

R¹ is hydrogen, $(C_1-C_6)$-alkyl, $(C_1-C_4)$-alkoxy or halogen or combines with R² to form the group —*CH(CH₃)CH₂C(CH₃)₂—, where the carbon atom marked by * is attached to the phenyl nucleus;

R² and R³ independently are hydrogen, $(C_1-C_6)$-alkyl, substituted $(C_1-C_6)$-alkyl, $(C_3-C_4)$-alkenyl or substituted $(C_3-C_4)$-alkenyl;

R⁴ is —CHR⁵CN, —CHR⁶COR⁷ or —CH=CH₂; and

L is $(C_2-C_6)$-alkylene, oxygen-interrupted $(C_2-C_6)$-alkylene, $(C_2-C_6)$-alkenylene, arylene or substituted arylene and D' is 3,5-dicyano-4-chloro-2-thienyl, 3,5-dicyano-2-thienyl, 3,5-dicyano-4-methyl-2-thienyl, 3-cyano-5-nitro-2-thienyl, 3-cyano-4-chloro-5-formyl-2-thienyl, 3,5-dinitro-2-thienyl, 3-acetyl-5-nitro-2-thienyl, 5-acetyl-3-nitro-2-thienyl, 3-(($C_1-C_4$)-alkoxycarbonyl)-5-nitro-2-thienyl, 5-phenylazo-3-cyano-2-thienyl, 5-(4-nitrophenylazo)-3-cyano-2-thienyl, 5-nitro-2-thiazoyl, 4-chloro-5-formyl-2-thiazolyl, 5-nitro-3-benzisothiazolyl, 7-bromo-5-nitro-3-benzisothiazolyl, 7-chloro-5-nitro-3-benzisothiazolyl, 3-methyl-4-cyano-5-isothiazolyl, 3-phenyl-1,2,4-thiadiazol-2-yl, 5-(($C_1-C_2$)-alkylmercapto))-1,3,4-thiadiazol-2-yl, 1-cyanomethyl-4,5-dicyano-2-imidazolyl, 6-nitrobenzothiazol-2-yl, 5-nitrobenzothiazol-2-yl, 6-rhodan-2-benzothiazolyl, 6-chloro-2-benzothiazolyl or (5),6,(7)-dichloro-2-benzothiazolyl.

11. A process for preparing a dye of the formula (I) as claimed in claim 1, which comprises diazotizing a compound of the formula (III)

D-NH₂ (III)

where D is as defined in claim 1, and coupling onto a compound of the formula (IV)

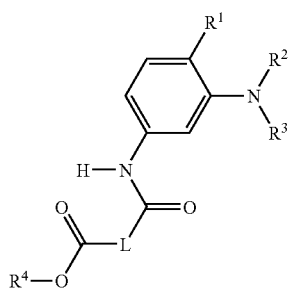

(IV)

wherein

R¹ is hydrogen, $(C_1-C_6)$-alkyl, $(C_1-C_4)$-alkoxy or halogen or combines with R² to form the group —*CH(CH₃)CH₂C(CH₃)₂—, where the carbon atom marked by * is attached to the phenyl nucleus;

R² and R³ independently are hydrogen, $(C_1-C_6)$-alkyl, substituted $(C_1-C_6)$-alkyl, $(C_3-C_4)$-alkenyl or substituted $(C_3-C_4)$-alkenyl;

R⁴ is —CHR⁵CN, —CHR⁶COR⁷ or —CH=CH₂; and

L is $(C_2-C_6)$-alkylene, oxygen-interrupted $(C_2-C_6)$-alkylene, $(C_2-C_6)$-alkenylene, arylene or substituted arylene.

12. A process for dyeing or printing a hydrophobic material which comprises contacting the material with the dye as claimed in claim 1.

13. An ink for digital textile printing by the ink jet process, comprising the dye of the formula (I) as claimed in claim 1.

* * * * *